United States Patent
Ro et al.

(10) Patent No.: US 7,411,894 B2
(45) Date of Patent: Aug. 12, 2008

(54) APPARATUS AND METHOD FOR GUARD INTERVAL INSERTING/REMOVING IN AN OFDM COMMUNICATION SYSTEM

(75) Inventors: Jung-Min Ro, Suwon-si (KR); Jingyl Liao, Beijing (CN); Hai Wang, Beijing (CN); Yongchun Chen, Beijing (CN); Fengming Cao, Beijing (CN); Pan-Yuh Joo, Seoul (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 952 days.

(21) Appl. No.: 10/666,514

(22) Filed: Sep. 18, 2003

(65) Prior Publication Data
US 2004/0066802 A1  Apr. 8, 2004

(30) Foreign Application Priority Data
Oct. 8, 2002  (KR) .............. 10-2002-0061332

(51) Int. Cl.
  *H04J 11/00* (2006.01)
  *H04J 3/00* (2006.01)
  *H04J 1/00* (2006.01)
(52) U.S. Cl. ............... 370/203; 370/479; 370/480
(58) Field of Classification Search ............. 370/203, 370/480, 476

See application file for complete search history.

(56) References Cited

U.S. PATENT DOCUMENTS

2003/0227978 A1* 12/2003 Magee et al. ............... 375/260
2003/0231714 A1* 12/2003 Kjeldsen et al. ............ 375/259

OTHER PUBLICATIONS

Liao Jingyi, Pan Yuh Joo, Wang Hai, Jungmin Ro, DS Park, "The Effect of Filling Unique Words to Guard Interval for OFDM System", IEEE c802.16a-02/87, pp. 0-8, Sep. 18, 2002.

* cited by examiner

*Primary Examiner*—Kevin C Harper
(74) *Attorney, Agent, or Firm*—The Farrell Law Firm, PC

(57) ABSTRACT

A transceiver system and method in an OFDM communication system which enables exact symbol synchronization acquisition and improves performance for frequency offset and channel estimation. In the apparatus, a guard interval filling unit copies data at a predetermined interval in an input data row inputted to be transmitted, and fills in the copied data in the preset guard interval in the input data row. A selection unit selectively receives an output data row outputted from the guard interval filling means and unique words having a constant amplitude and a non-periodic auto-correlation characteristic, and outputs the OFDM symbol in which the unique words are inserted in the output data row.

9 Claims, 12 Drawing Sheets

APPARATUS AND METHOD FOR GUARD INTERVAL INSERTING/REMOVING IN AN OFDM COMMUNICATION SYSTEM

PRIORITY

This application claims priority to an application entitled "Guard Interval Inserting/Removing Apparatus And Method In An OFDM Communication System" filed in the Korean Industrial Property Office on Oct. 8, 2002 and assigned Serial No. 2002-61332, the contents of which are hereby incorporated by reference.

BACKGROUND OF THE INVENTION

1. Field of the Invention

The present invention relates to a communication system employing an Orthogonal Frequency Division Multiplexing (hereinafter, referred to as 'OFDM') technique, and more particularly to an apparatus and method for generating an OFDM symbol in which a guard interval is inserted.

2. Description of the Related Art

In general, data are carried by a predetermined carrier when the data are transmitted by a wireless communication system. Further, in order to transmit data by means of a predetermined carrier, it is necessary to modulate the data. Such modulation may employ various techniques, one representative of which is an OFDM technique.

The OFDM technique is a modulation technique of 4th Generation Mobile Communication Systems, which it is anticipated being adopting as a digital television standard in Europe, Japan, and Australia, and which was initially recommended as a wireless LAN technique in the early 1990's. According to the OFDM technique, data are distributed to a plurality of carriers spaced at regular frequency intervals from each other, each at an exact frequency, thereby preventing any particular decoder receiving the data from referring to other frequencies which are not transmitted to that particular decoder, that is, providing "orthogonality" among different signals.

The modulation schemes for carriers employed in OFDM systems include multiplexing modulation schemes such as QPSK (Quadrature Phase Shift Keying) for voice broadcasting and 64 QAM (Quadrature Amplitude Modulation) for ground wave digital television broadcasting (which has good band use efficiency). OFDM systems use different modulation schemes according to the characteristics described above. However, in OFDM communication systems, data are transmitted by units based on OFDM symbols regardless of the modulation schemes. Each of the OFDM symbols used in the OFDM communication systems includes an effective symbol interval and a guard interval. Herein, the guard interval is a signal interval for reducing multipath effects or ghost phenomena.

In a system employing the OFDM technique, N pieces of parallel data to be transmitted are carried on N sub-carriers having orthogonality to each other, so that the parallel data are multiplexed. Thereafter, the multiplexed data are summed and transmitted. Herein, when the N pieces of parallel data construct an OFDM symbol, the orthogonality among the N sub-carriers in the OFDM symbol prevents interference among the sub-carrier channels. Therefore, in comparison with an pre-existing single carrier transmission technique, the OFDM technique can increase the symbol period by a factor of the number N of the sub-carrier channels while maintaining the same symbol transmission rate.

Further, in the case of increasing the periods of transmitted symbols and inserting guard intervals between the symbols, the guard intervals can prevent multipath delay or interference between symbols which may be caused by delay of the symbols received through the multipaths and can maintain the orthogonality between the sub-carriers. Moreover, interference among channels, which may be caused by decrease of the orthogonality among the sub-carriers, can be reduced.

A reception terminal for receiving the OFDM signal can perform synchronization by means of the guard intervals inserted among the symbols. The OFDM synchronization includes synchronization for acquiring symbol time offset and synchronization for acquiring frequency offset. Beginning points of the OFDM symbols are estimated in the synchronization for acquiring symbol time offset, and degree of frequency offset of OFDM sub-carriers is estimated in the synchronization for acquiring frequency offset.

In synchronization acquisition utilizing a guard interval of an OFDM symbol, there is a correlation between samples in a guard interval and samples copied to generate the guard interval. Therefore, in a symbol, a position where a correlation value between a guard interval and an interval copied for the guard interval becomes maximum can be considered as the beginning of the guard interval. Usually, after synchronization acquisition is completed utilizing a guard interval, frequency offset is estimated using the acquired information. When the synchronization process for acquiring the frequency offset of the received OFDM symbol is not exact, loss of effective data cannot be prevented. This correlation eliminates the necessity of a pilot symbol in channel estimation. Therefore, the OFDM technique as described above can improve bandwidth efficiency and reduce power consumption.

Due to the reasons described above, OFDM wireless communication systems which employ a technique for inserting guard intervals are being developed in fields requiring high speed data transmission systems, such as Digital Audio Broadcasting (DAB), Digital Video Broadcasting (DVB), Digital Terrestrial Television Broadcasting (DTTB), Wireless Local Area Network (WLAN), and Wireless Asynchronous Transfer Mode (WATM). Also, digital wire communication systems employing a Discrete Multi-Tone (DMT) technique, such as Asymmetric Digital Subscriber Line (ADSL) and Very-high bit rate Digital Subscriber Line (VDSL), necessarily require the technique for inserting guard intervals.

FIG. 1 is a block diagram of a typical OFDM communication system, and shows channel environment as well as blocks of a transmitter and a receiver.

Referring to FIG. 1, the OFDM transmitter 110 includes a mapper 111, a serial-to-parallel (S/P) converter 112, an N-point Inverse Fast Fourier Transform (IFFT) device 113, a Parallel-to-Serial (P/S) converter 114, a guard interval inserter 115, and a digital-to-analog (D/A) converter 116.

The data source to be transmitted is inputted to the mapper 111 of the transmitter 110. The data inputted to the mapper 111 are modulated according to a modulation scheme adopted in each system and then inputted to the S/P converter 112. The S/P converter 112 converts the modulated serial data into N pieces of parallel data $x_f(k)$ and then inputs the converted parallel data to the IFFT device 113. Then, the IFFT device 113 performs Inverse Fourier Transform for the N pieces of parallel data and then inputs them to the P/S converter 114. The P/S converter 114 converts the Inverse Fourier Transformed data into serial data $x_f(n)$ and inputs the converted serial data to the guard interval inserter 115. The guard interval inserter 115 inserts a guard interval in the data from the P/S converter 114, thereby converting the data $x_f(n)$ into data $\tilde{x}_l(\tilde{n})$ which construct an OFDM symbol. The OFDM symbol outputted from the guard interval inserter 115 in this way is converted into an analog signal in the D/A converter 116, which is then transmitted through a predetermined wireless channel.

The wireless channel through which the OFDM symbol generated through the above-described process is transmitted is a multipath channel 120. When the multipath channel 120 is assumed to be a function $H_l(k)$, the outputted OFDM symbols can be considered as values obtained by calculation using the function. Further, when noise generated in the channel environment is assumed to be $\tilde{w}_l(\tilde{n})$, the signal received by the receiver has a value obtained by adding the generated noise to the value obtained by the function.

The receiver 130 includes an analog-to-digital (A/D) converter 131, a guard interval remover 132, a serial-to-parallel (S/P) converter 133, an N-point Fast Fourier Transform (FFT) device 134, an equalizer 135, a synchronization and channel estimation device 136, a parallel-to-serial (P/S) converter 137, and a demapper 138.

The received signal to which noise is added while passing the multipath channel 120 is inputted to the A/D converter 131. The A/D converter 131 converts the received analog signal into a digital signal of the form $\tilde{y}_l(\tilde{n})$ and then outputs the converted digital signal. The digital signal outputted from the A/D converter 131 is inputted to the guard interval remover 132. The guard interval remover 132 removes the guard interval from the inputted digital signal $\tilde{y}_l(\tilde{n})$ and then outputs a signal in a form of $y_l(n)$. That is to say, the signal from which the guard interval has been removed by the guard interval remover 132 includes only the effective OFDM data. The effective OFDM data are inputted to the S/P converter 133. The S/P converter 133 parallelizes the inputted signal and then outputs the parallelized data to the FFT device 134. The FFT device 134 performs an N-point Fast Fourier Transform (FFT), thereby outputting Fast Fourier Transformed parallel data $y_l(k)$.

The Fast Fourier Transformed parallel data are inputted to, are channel-equalized in, and are then outputted as a signal such as $\tilde{X}_l(k)$ from, the equalizer 135. The signal outputted from the equalizer 135 is inputted to the P/S converter 137. The P/S converter 137 converts the inputted parallel signal into a serial signal and then outputs the serial signal. The converted serial signal is inputted to and demodulated in the demapper 138, so that complete data can be extracted from the signal. Further, the synchronization and channel estimation device 136 acquires symbol synchronization and performs channel estimation for establishing some parameters of the equalizer 135.

During the process described above, when the guard interval inserter 115 inserts the guard interval, the guard interval inserter 115 inserts a Cyclic Prefix (CP), which is longer than the channel impulse response, in a guard interval position between adjacent OFDM symbols, thereby eliminating interference between adjacent symbols and interference between channels.

FIG. 2 illustrates a construction of an OFDM symbol in which a guard interval is inserted according to a conventional CP method.

Referring to FIG. 2, in order to maintain the orthogonality between sub-channels, a guard interval including Tc a number of samples is located before effective data including a number T of samples. In this case, the Tc samples of the guard interval 20 are produced by copying Tc samples 21 to the rear portion of the effective data, which corresponds to the location of the guard interval. Therefore, the size in samples of the OFDM symbol is a sum of Tc, which is the number of samples constituting the CP or guard interval, and T, which is the number of samples constituting the effective data. In this method, Inverse Fast Fourier Transformed effective data (T number of samples) are inputted in series only after a delay corresponding to a sample size (Tc samples) sufficient to allow insertion of the guard interval, and then the rear portion of the effective data is copied as a CP to the delayed interval. Therefore, a delay device (buffer) as many as the FFT/IFFT size T, a memory, or a memory address generator is indispensable and an initial delay of Tc is caused in this method.

For synchronization acquisition in the symbol realized as in FIG. 2, beginning synchronization of the symbol is acquired by performing correlation between the CP during the guard interval Tc and the symbol interval copied to generate the CP, that is, correlation between the guard interval 20 and the copied effective interval 21 in FIG. 2. In this case, a reception terminal must know an exact Signal to Noise Ratio (SNR) for the synchronization acquisition. In other words, if the reception terminal cannot calculate a sufficiently exact SNR, exact synchronization acquisition for the symbol cannot be anticipated and thus frequency offset estimation based on exact synchronization acquisition is impossible.

SUMMARY OF THE INVENTION

Accordingly, the present invention has been made to solve the above-mentioned problems occurring in the prior art, and an object of the present invention is to provide a transceiver system and method in an OFDM communication system which enable exact symbol synchronization acquisition and improves performance for frequency offset and channel estimation.

It is another object of the present invention to provide a transceiver system and method in an OFDM communication system which enable exact symbol synchronization acquisition, thereby reducing interference between adjacent symbols and interference between channels.

It is another object of the present invention to provide a system and method of transmitting a pilot sequence in an OFDM communication system, so as to improve transmission efficiency.

In order to accomplish these objects, the present invention proposes an apparatus for transmitting an OFDM symbol in an OFDM communication system, the OFDM symbol including a guard interval and a data interval.

In an apparatus according to an aspect of the present invention, a guard interval filling unit copies data at a predetermined interval in an input data row which is inputted to be transmitted, and fills in the copied data in the guard interval set in advance in the input data row. A selection unit selectively receives an output data row outputted from the guard interval filling unit and unique words having a constant amplitude and a non-periodic auto-correlation characteristic, and outputs the OFDM symbol generated when the unique words are inserted in the output data row.

The apparatus may further comprise a buffer for storing the unique words, and a control unit for controlling selective input operation of the selection means.

As an example, the guard interval may be located before the input data row. In this case, the unique words may be located before the guard interval, or between the guard interval and the input data row, or in the middle of the guard interval.

As another example, the guard interval may be located after the input data row. In this case, the unique words may be located before the input data row.

As still another example, the guard interval may have two portions, one located before and the other after the input data row. In this case, the unique words may be located before the guard interval.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

In order to enable a reception terminal to acquire more exact symbol synchronization and perform more exact frequency offset and channel estimation, a communication system of an OFDM type (hereinafter, referred to as an "OFDM system") according to the present invention employs an OFDM symbol having a guard interval which includes a Unique Word (UW) sequence, in addition to an pre-existing guard interval, which is constituted by a Cyclic Prefix (CP). It should be noted that the present invention can be applied not only to typical OFDM systems but also to, for example, Orthogonal Frequency Division Multiplexing—Code Division Multiplexing (OFDM-CDM) type systems, Orthogonal Frequency Division Multiplexing—Frequency Hopping—Code Division Multiplexing (OFDM-FH-CDM) type systems, and Discrete Multi—Tone (DMT) type systems.

According to an embodiment of the present invention, a Unique Word sequence inserted in a guard interval of an OFDM symbol may employ a pilot data row having a Constant Amplitude Zero Auto—Correlation (CAZAC) characteristic. Herein, the CAZAC characteristic implies that a data row has a constant amplitude and a non-periodic auto-correlation characteristic of '0'. The widely known Chu and Frank-Zadoff sequences may be used for such data rows. Such data rows have lengths of $2^n$. Data rows of the types shown in Table 1 may be used as the Unique Word sequence according to the length of the data rows. That is, a Unique Word sequence having the CAZAC characteristic may be used as the 'UW sequence' or 'pilot data row'.

TABLE 1

| Length | Type |
| --- | --- |
| 8 | Chu |
| 16 | Frank-Zadoff |
| 32 | Chu |
| 64 | Frank-Zadoff |
| 128 | Chu |
| 256 | Frank-Zadoff |
| 512 | Chu |

Herein, the pilot data row includes I and Q components indexed by n, and the length of the pilot data row is U, in which $0 \leq n < U$.

$$I[n] = \cos(\theta[n])$$
$$Q[n] = \sin(\theta[n])$$
Equation 1

, where $\theta[n] = \theta_{chu}[n]$ in Chu data rows and $\theta[n] = \theta_{frank}[n]$ in Frank-Zadoff data rows. That is, the data rows are represented by in-phase and quadrature components.

Chu data rows can be expressed by Equation 2, and Frank-Zadoff data rows can be expressed by Equation 3, as shown below.

$$\theta_{chu}[n] = \frac{\pi n^2}{U}$$
Equation 2

$$\theta_{frank}[n = p + q\sqrt{U}] = \frac{2\pi pq}{U}$$
$$p = 0, 1, \ldots \sqrt{U} - 1$$
$$q = 0, 1, \ldots \sqrt{U} - 1$$
Equation 3

The pilot data row to be added to the guard interval of an OFDM symbol according to the present invention is first stored in a buffer or memory and then added to the pre-existing guard interval of the OFDM symbol by a control signal.

Figure 3A:
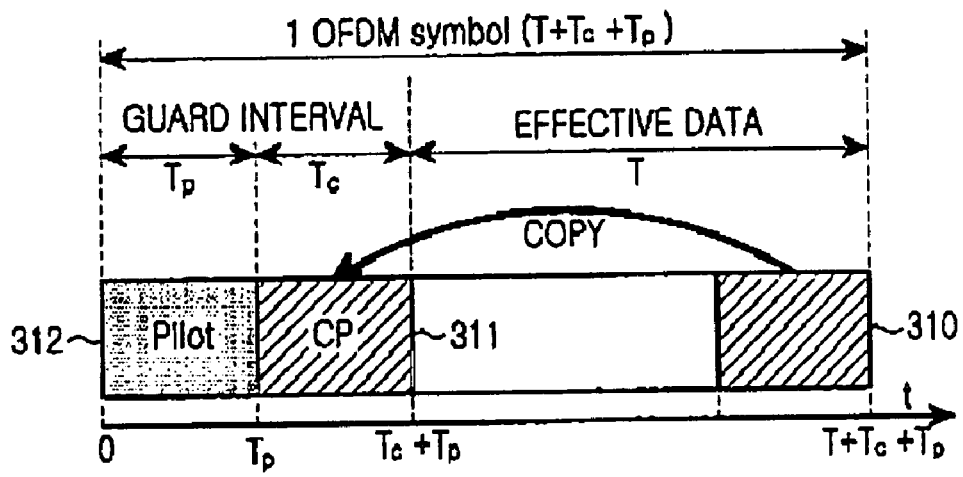
FIG. 3A illustrates a structure of an OFDM symbol in which a pilot guard interval has been additionally inserted according to an embodiment of the present invention.

FIG. 3A illustrates a structure of an OFDM symbol in which the pilot data row is located before the guard interval, having been inserted according to the pre-existing method. In the following description, the guard interval having been inserted according to the pre-existing method will be named "copy guard interval", and the guard interval formed by the pilot data row will be named "pilot guard interval".

Figure 3B:
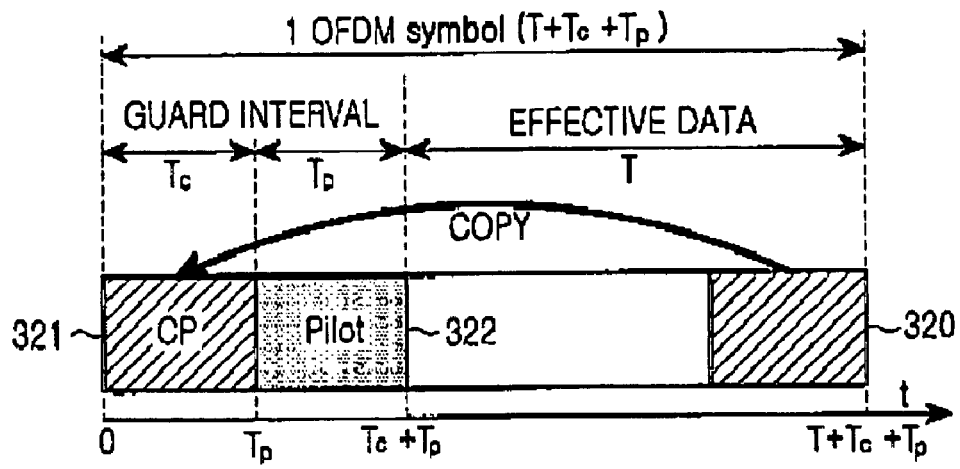
FIG. 3B illustrates a structure of an OFDM symbol in which a pilot guard interval has been additionally inserted according to another embodiment of the present invention.
Figure 3C:
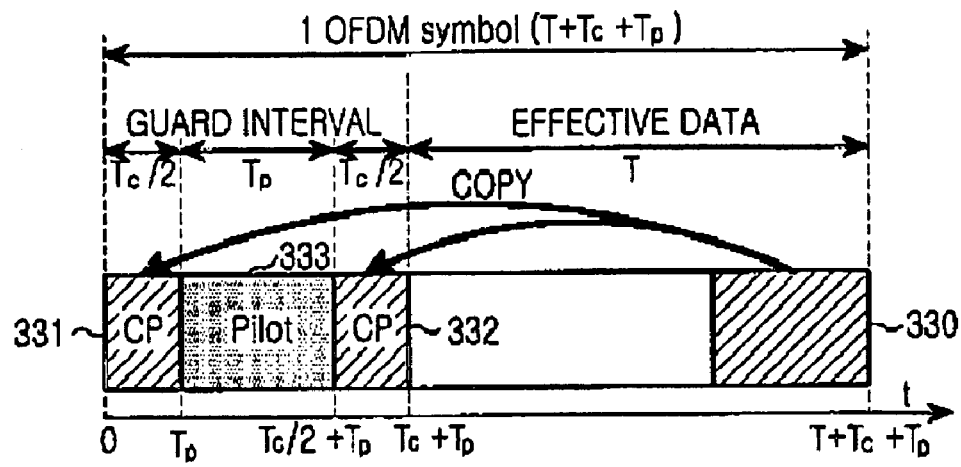
FIG. 3C illustrates a structure of an OFDM symbol in which a pilot guard interval has been additionally inserted according to another embodiment of the present invention.

The pilot guard interval may be either located before the copy guard interval as shown in FIG. 3A or inserted between the copy guard interval and the effective data as shown in FIG. 3B. Also, the pilot guard interval may be inserted in the middle of the copy guard interval. FIG. 3C shows an embodiment in which the pilot guard interval is inserted between separated halves of the copy guard interval. The copy guard interval in which the pilot guard interval is inserted may be divided in proportions other than one-half.

Figure 4A:
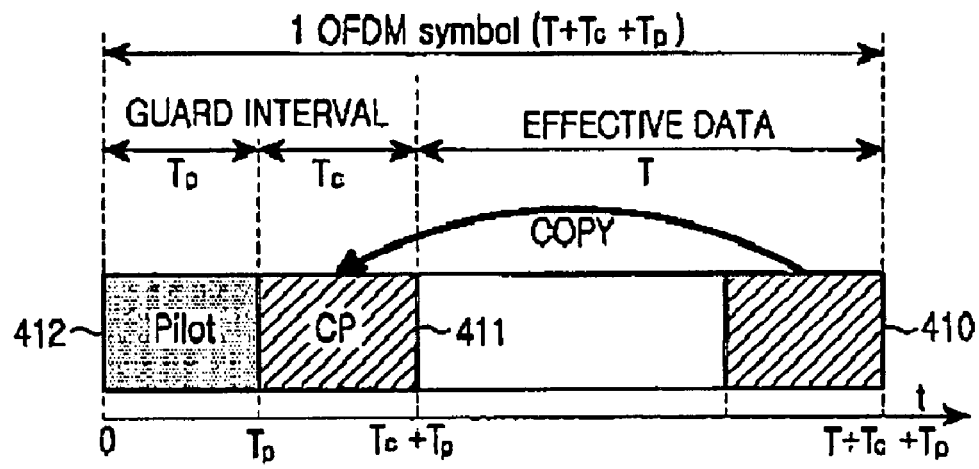
FIG. 4A illustrates a structure of an OFDM symbol in which a copy guard interval has been inserted in the CP method and a pilot guard interval has been inserted according to an embodiment of the present invention.

FIG. 4A illustrates a structure of an OFDM symbol which includes the pilot data row according to the present invention.

Figure 2:
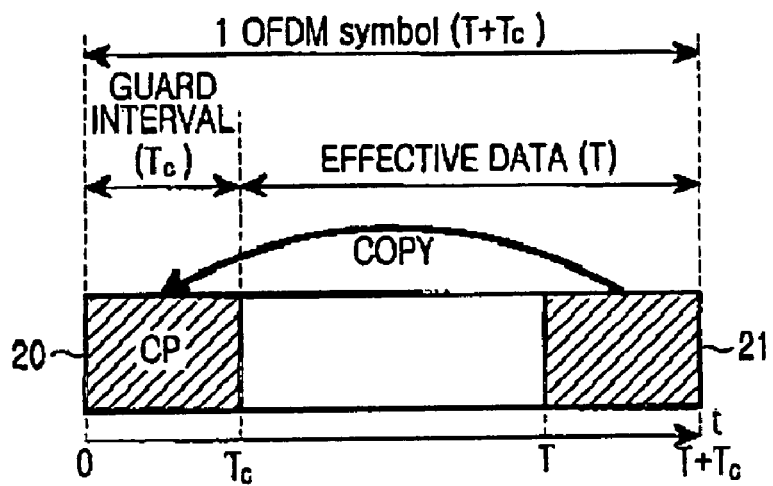
FIG. 2 illustrates a construction of an OFDM symbol in which a guard interval is inserted according to a conventional CP method.

In the present embodiment, the pre-existing guard interval is inserted according to the CP method. However, the CP method is only one embodiment of the present invention, and the present invention may employ other methods for inserting the guard interval. A process of inserting the guard interval according to the CP method has been already described above with reference to FIG. 2. Hereinafter, a process of adding a pilot data row to an pre-existing guard interval already formed by the CP method will be described with reference to the drawings. The guard interval according to the present invention has a length Tc+Tp corresponding to the sum of the lengths of the copy guard interval and the pilot guard interval instead of the length Tc used in the conventional guard interval as shown in FIG. 2.

The copy guard interval is copied from the effective data. Referring to FIG. 4A, data in an interval 410 from (T+Tp) to (T+Tc+Tp) in the effective data interval are copied and then inserted in the copy guard interval 411 from Tp to (Tc+Tp). The pilot guard interval is comprised of a pilot data row having the CAZAC characteristic described above. A data row with a predetermined length is filled in an interval 412 from 0 to Tp. Although the present embodiment refers to an OFDM in which the pilot guard interval is located before the copy guard interval, the pilot guard interval can be located after the copy guard interval or at any position based on the copy guard interval, that is, the pilot guard interval can be inserted in the middle of the copy guard interval. In this way, one OFDM symbol is completed.

Figure 4B:
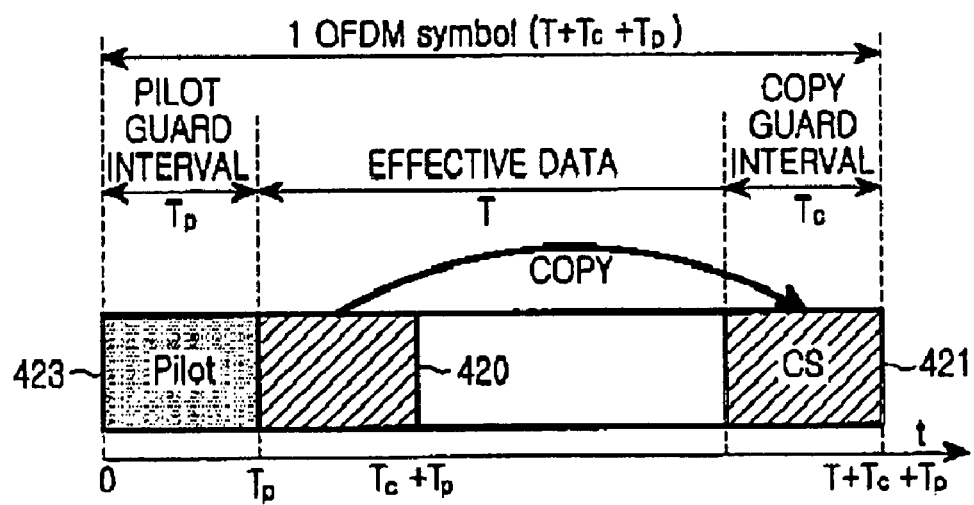
FIG. 4B illustrates a structure of an OFDM symbol in which a copy guard interval has been inserted in the CS method and a pilot guard interval has been inserted according to an embodiment of the present invention.

FIG. 4B shows another embodiment, employing a method of inserting the copy guard interval which is different from the method in the embodiment shown in FIG. 4A. This embodiment employs a Cyclic Suffix (CS) method in inserting the copy guard interval, in which a predetermined interval of the foremost portion of the effective data are copied and the copied data are then placed after the effective data.

Referring to FIG. 4B, the copy guard interval is inserted using the CS method, and then the pilot guard interval is filled. First, data in an interval 420 from Tp to (Tc+Tp) in the effective data interval are copied and then filled in the copy guard interval 421 from (T+Tp) to (T+Tc+Tp). The pilot guard interval is comprised of a pilot data row having the CAZAC characteristic described above. A data row with a predetermined length is filled in an interval 423 from 0 to Tp. Although the present embodiment refers to an OFDM in which the pilot guard interval is located before the copy guard interval, the pilot guard interval can be located after the copy guard interval or at any position based on the copy guard interval, that is, the pilot guard interval can be inserted in the middle of the copy guard interval. In this way, one OFDM symbol is completed.

Figure 4C:
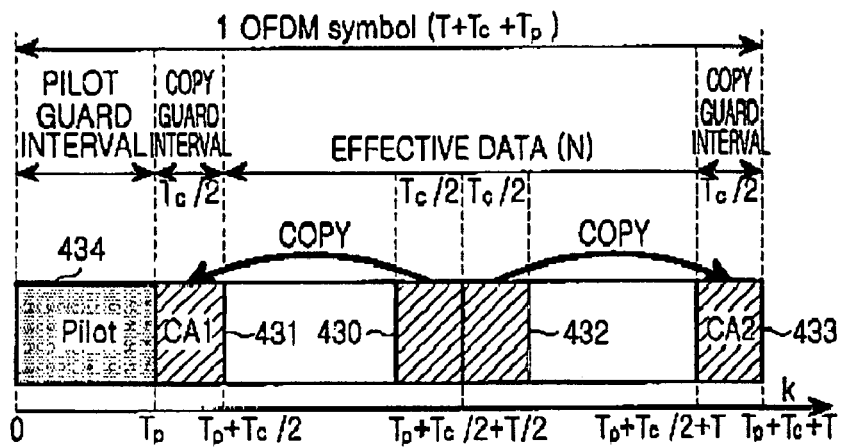
FIG. 4C illustrates a structure of an OFDM symbol in which a copy guard interval has been inserted in the CA method and a pilot guard interval has been inserted according to an embodiment of the present invention.

FIG. 4C shows another embodiment, employing a method of inserting the copy guard interval which is different from the method in the embodiment shown in FIG. 4A. This embodiment employs a Cyclic Affix (CA) method in inserting the copy guard interval, in which a predetermined interval of effective data are copied, the copied data are divided in predetermined proportions, and then the divided two portions are placed before and after the effective data.

Referring to FIG. 4C, the copy guard interval is inserted using the CA method, and then the pilot guard interval is filled. Data in an interval 430 from (Tp+Tc/2) to (Tc/2+Tp+T/2) in the effective data interval are copied and then filled in a divided copy guard interval 431 from Tp to (Tp+Tc/2), and data in an interval 432 from (Tp+Tc/2+T/2) to (Tc+Tp+T/2) in the effective data interval are copied and then filled in a divided copy guard interval 433 from (Tp+Tc/2+T) to (Tp+Tc+T). Therefore, the entire copy guard interval includes two divided copy guard intervals 431 and 433. The pilot guard interval is comprised of a pilot data row having the CAZAC characteristic described above. A pilot data row with a predetermined length is filled in an interval 434 from 0 to Tp. Although the present embodiment refers to an OFDM in which the pilot guard interval is located before the copy guard interval, the pilot guard interval can be located after the copy guard interval or at any position based on the copy guard interval, that is, the pilot guard interval can be inserted in the middle of the copy guard interval. Further, according to the present invention, the pilot guard interval can be inserted without insertion of the copy guard interval. In this way, one OFDM symbol is completed.

Figure 5:
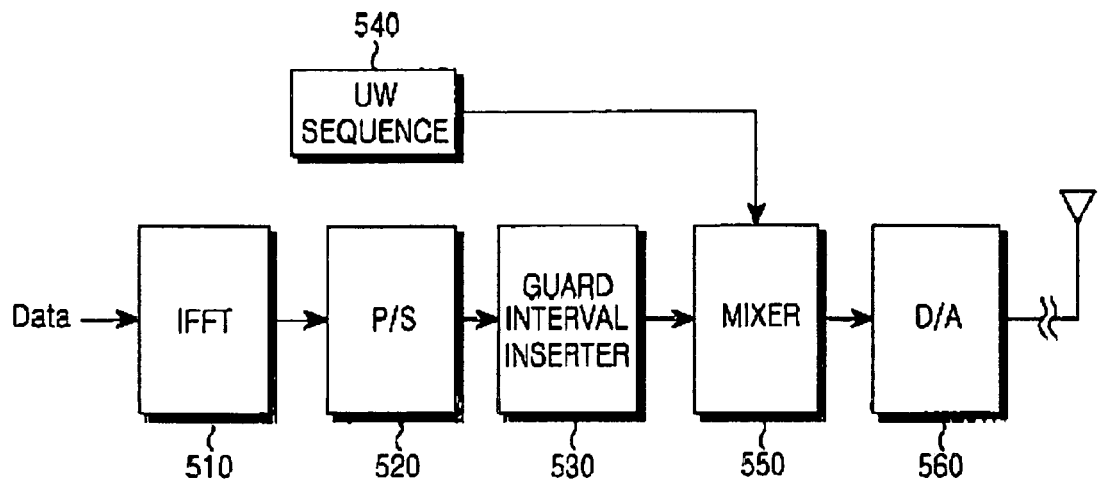
FIG. 5 is a block diagram of a transmitter in an OFDM system according to an embodiment of the present invention.

FIG. 5 is a block diagram showing a construction of a transmitter in an OFDM system according to an embodiment of the present invention.

Referring to FIG. 5, the transmitter includes an Inverse Fast Fourier Transform (IFFT) device 510, a Parallel-to-Serial (P/S) converter 520, a guard interval inserter 530, a mixer 550, and a digital-to-analog (D/A) converter 560.

The IFFT device 510 performs IFFT on data inputted to be transmitted. The P/S converter 520 converts the parallel data row inputted from the IFFT device 510 into a serial data row. The guard interval inserter 530 copies data in a predetermined interval in the serial data row and inserts the copied data at a predetermined location for the guard interval in the serial data row. The mixer 550 receives the output of the guard interval inserter 530 and a UW sequence 540, inserts the UW sequence 540 at a predetermined location of the guard interval, and then outputs one OFDM symbol data. The D/A converter 560 converts the output from the mixer 550 into analog data and then outputs the analog data, which are then transmitted through an antenna.

Figure 6:
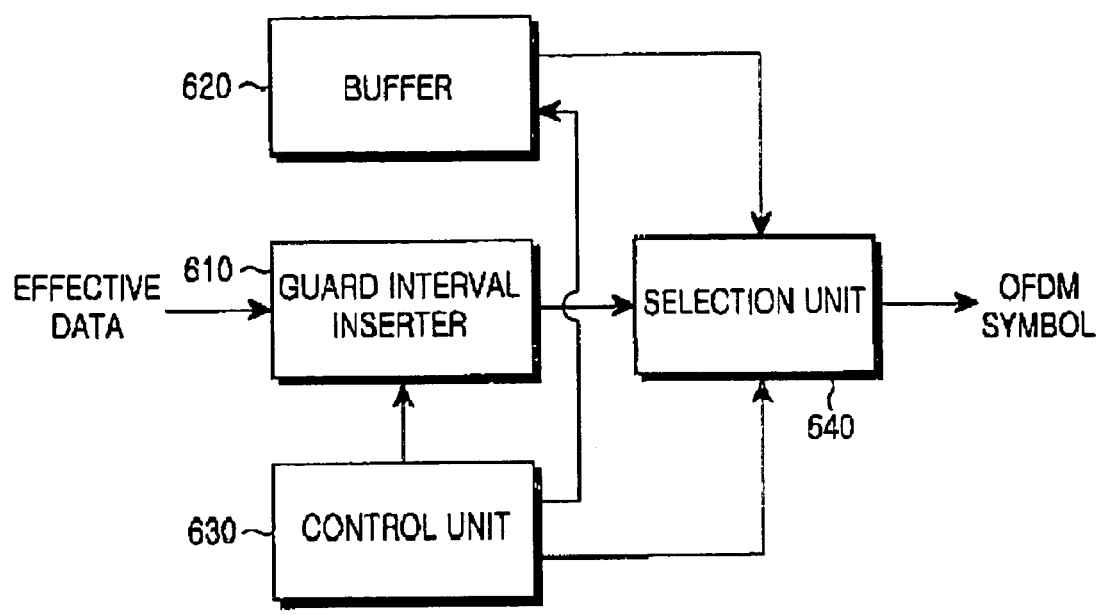
FIG. 6 is a block diagram of a guard interval inserting device according to an embodiment of the present invention.

FIG. 6 is a block diagram showing a construction of a guard interval inserting device according to an embodiment of the present invention.

Referring to FIG. 6, the guard interval inserting device includes the guard interval inserter 610, a buffer 620, a control unit 630, and a selection unit 640. The guard interval inserter 610 copies data in a predetermined interval in the data row inputted to be transmitted and inserts the copied data at a predetermined location for the guard interval in the data row. The buffer 620 stores Unique Words having a constant amplitude and a non-periodic auto-correlation characteristic. The selection unit 640 selectively receives the data row outputted from the guard interval inserter 610 and the Unique Words and outputs an OFDM symbol in which the Unique Words are inserted in the output data row. The control unit 630 controls the selective operation of the selection unit 640.

As an example, the guard interval may be located before the input data row. In this case, the Unique Words may be located before, after, or in the middle of the guard interval, or before the input data row.

As another example, the guard interval may be located after the input data row. In this case, the Unique Words may be located before the input data row.

As still another example, divided guard intervals may be located before and after the input data row. In this case, the Unique Words may be located before the guard intervals.

Figure 1:
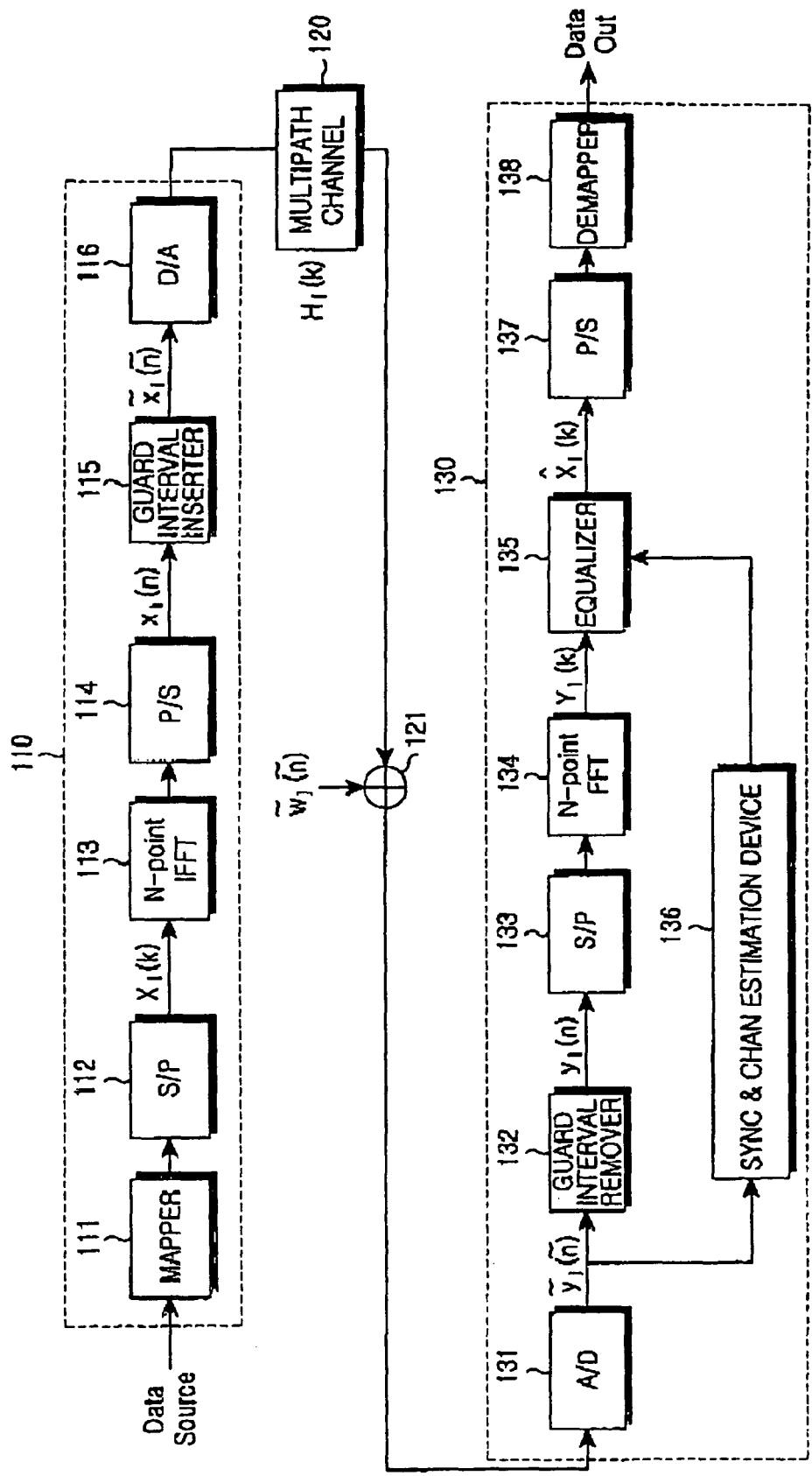
FIG. 1 is a block diagram of a typical OFDM communication system, which shows channel environment as well as blocks of a transmitter and a receiver.

The data outputted from the P/S converter 114 in FIG. 1 are Inverse Fast Fourier Transformed serial data, which are effective data having a length of T as shown in FIG. 4A. The effective data are inputted to the guard interval inserter 610 and are then outputted as a data row in which a copy guard interval is inserted. A predetermined number of data rows having a predetermined length to be inserted in the pilot guard interval are stored in the buffer 620. The control unit 630 outputs control signals to the pre-existing guard interval inserter 610 and the buffer 620 to control the time point at which the guard interval is inserted in each symbol. Further, the control unit 630 sends a control signal to the selection unit 640 to select a sequence in which the output of the buffer 620 and the output of the guard interval inserter 610 are used to construct one OFDM symbol. This sequence will be described below in more detail with reference to FIG. 7.

Figure 7:
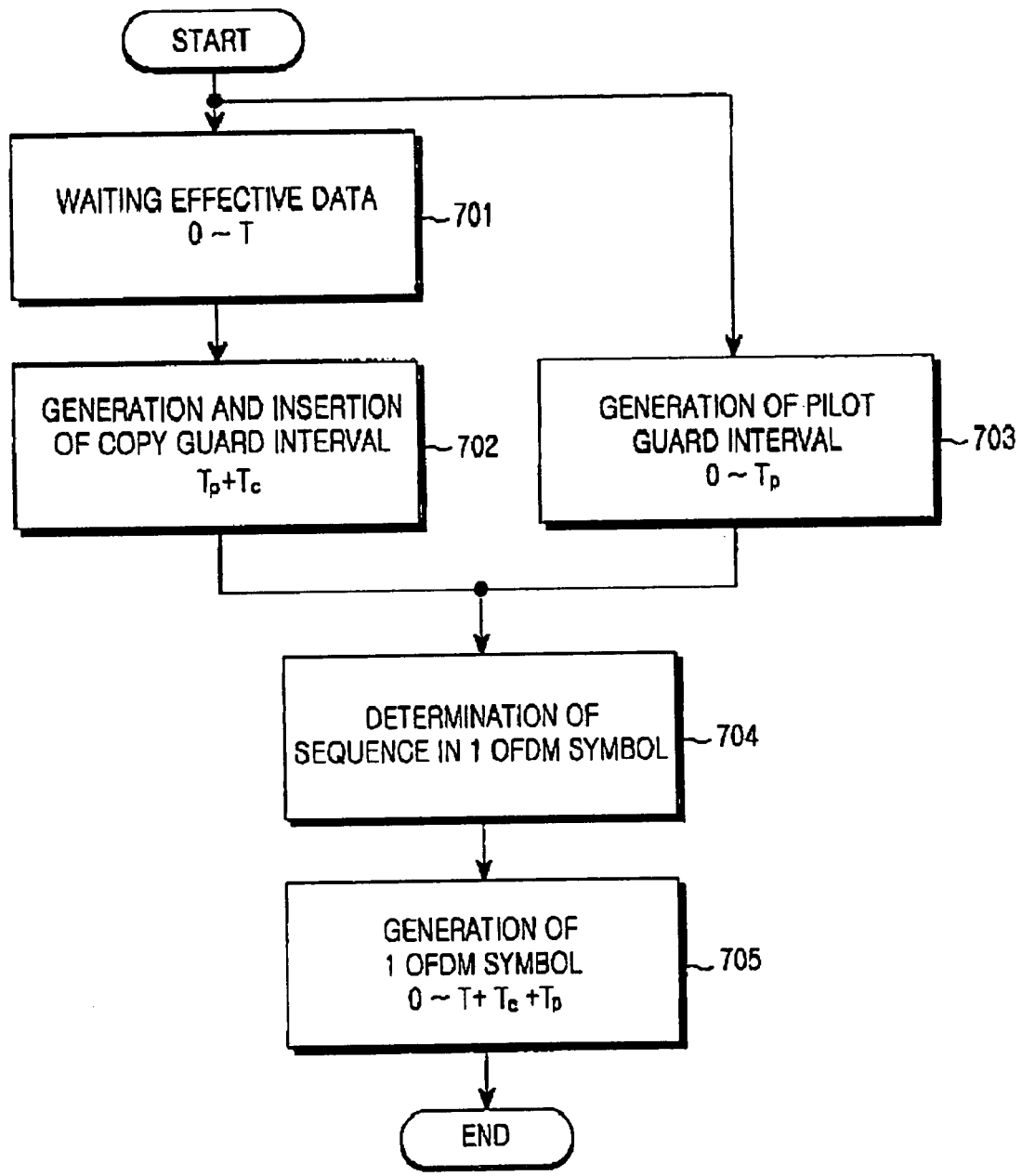
FIG. 7 is a flowchart showing a process of inserting a guard interval according to an embodiment of the present invention.

FIG. 7 is a flowchart showing a process of inserting a guard interval according to an embodiment of the present invention.

Referring to FIG. 7, the control unit shown in FIG. 6 is in a waiting state in step 701. Here, the waiting state refers to a state for waiting for input of effective data. When effective data are received, the pre-existing guard interval inserter 610 performs generation and insertion of a copy guard interval in step 702.

While the copy guard interval is generated and inserted in step 702, the buffer 570 generates a pilot guard interval in step 703. The pilot guard interval is generated during a period with a predetermined length Tp. Thereafter, the data row in which the copy guard interval is inserted at step 702 and the pilot guard interval is generated at step 703 are inputted to the selection unit 640 and are then outputted according to the control signal of the control unit 630. When a sequence between the pilot guard interval, the copy guard interval, and the effective data is determined in step 704, one OFDM symbol can be generated in step 705.

Figure 8:
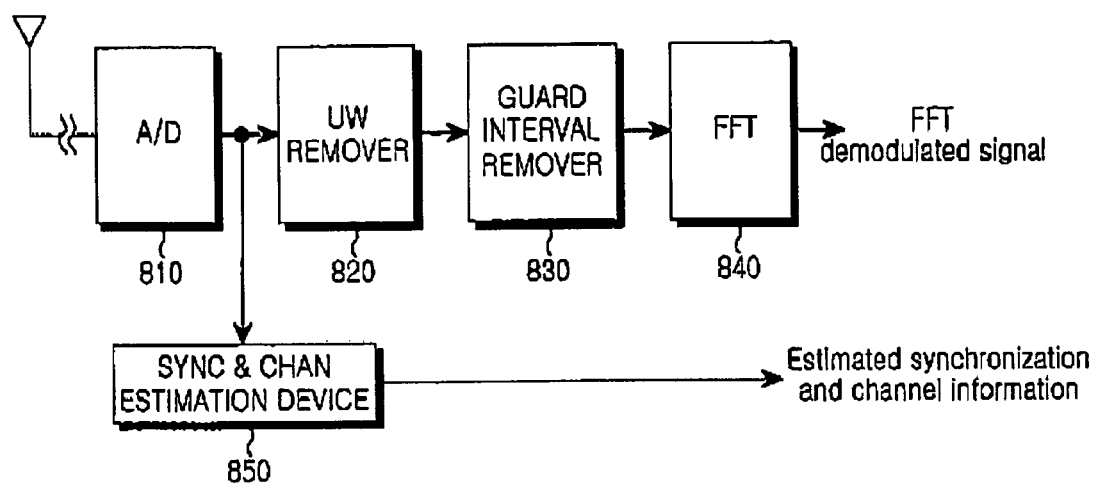
FIG. 8 is a block diagram of a receiver in an OFDM system according to an embodiment of the present invention.

FIG. 8 is a block diagram showing a construction of a receiver in an OFDM system according to an embodiment of the present invention.

Referring to FIG. 8, the receiver includes an analog-to-digital (A/D) converter 810, a UW remover 820, a guard interval remover 830, a Fast Fourier Transform (FFT) device 840, and a synchronization and channel estimation device 850.

Figure 9:
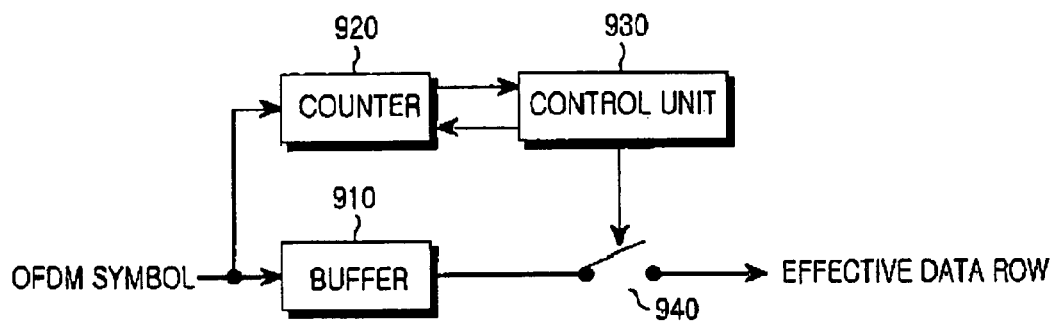
FIG. 9 is a block diagram of a guard interval remover in a receiver according to an embodiment of the present invention.

FIG. 9 is a block diagram of a guard interval remover in a receiver according to an embodiment of the present invention, which shows an inside construction of the guard interval remover for removing a guard interval from a received OFDM symbol. Hereinafter, inside construction and operation of the guard interval remover according to the present invention will be described in detail with reference to FIG. 9.

Referring to FIG. 9, the guard interval remover in the receiver according to the present invention has a construction which is not much different from that of an pre-existing guard interval remover. An OFDM symbol received after being A/D converted in a receiver is inputted to the guard interval remover from the transmitter as shown in FIG. 5. Then, the OFDM symbol is inputted to a buffer 910 and a counter 920.

A First-In First-Out (FIFO) device, which stores and outputs received OFDM symbols in sequence, or a latch circuit may be employed as the buffer 910. The counter 920 counts the total number of OFDM symbols whenever one is received, and outputs the total to a control unit 930. The control unit 930 may be reset whenever the counted number becomes a value corresponding to one OFDM symbol unit, or may have a construction capable of counting only a number corresponding to each OFDM symbol unit. Since the symbol must be counted after synchronization of the received signals is acquired, the counter 920 performs the counting after the acquisition of synchronization. That is, the UW remover 820 and the guard interval remover 830 respectively remove the UW and the guard interval by means of synchronization information acquired by the synchronization and channel estimation device 850. Further, the control unit 930 generates and outputs an ON/OFF control signal for a switch 940. The guard interval is removed from the signal outputted from the buffer 860 according to the ON/OFF operation of the switch 940, so that only an effective data row can be outputted.

Hereinafter, a process of acquiring symbol synchronization and estimating carrier frequency offset in the receiver according to an embodiment of the present invention will be described in detail.

The present invention enables symbol synchronization to be acquired very easily and accurately. The CAZAC data row used as a pilot data row has an excellent auto-correlation characteristic and a cross-correlation characteristic of nearly '0'. Therefore, the symbol synchronization acquisition according to the present invention has a much higher probability of success in comparison with symbol synchronization acquisition using only a CP.

When it is assumed that a baseband signal r(k) is received with a time offset $\ominus$ and a frequency offset $\epsilon$, it can be expressed as shown in Equation 4:

$$r(k)=s(k-\theta)e^{j2\pi\epsilon k/N}+n(k) \quad \text{Equation 4}$$

In Equation 4, k denotes a transmission time, N denotes a FFT size, s(k) denotes a transmitted signal, and n(k) denotes an Additive White Gaussian Noise (AWGN) signal.

$$E\{r(k)r^*(k+m)\}=\sigma_s^2+\sigma_n^2, \, m=0 \quad \text{Equation 5}$$

In Equation 5, r* denotes the complex conjugate of r.

Equation 5 is an equation for obtaining auto-correlation of the received signal r(k). Equation 5 enables the auto-correlation of the received signal r(k) to be calculated when m is equal to 0. However, when m is a length of one OFDM symbol, cross-correlation of the signal can be calculated by Equation 5. In Equation 5, k denotes one value of the time offset $\{\theta, \ldots, \theta+T_P+1\}$, and the transmission signal s(k) has a distribution calculated by $\sigma_s^2=E\{|s^2(k)|\}$, and the AWGN signal n(k) has a distribution calculated by $\sigma_n^2=E\{|n^2(k)|\}$. The synchronization is acquired when the auto-correlation value $E\{r(k)r^*(k)\}$ becomes maximum, in which k denotes the time offset $\ominus$.

$$E\{r(k)r^*(k+m)\} = \sigma_s^2 e^{-j2\pi\epsilon\frac{T_C+T_P+T}{T}}, \, m = T_C + T_P + T \quad \text{Equation 6}$$

The frequency offset can be estimated using Equation 6. That is, the frequency offset can be estimated by putting one symbol interval (Tc+Tp+T) into m in Equation 5 (m=$T_C$+$T_P$+T). Since the frequency offset represents a twisted degree of a frequency, at least two OFDM symbols must be examined in order to estimate the frequency offset. The frequency offset can be estimated using the exact time offset value $\ominus$ and the cross-correlation value of the received signal r(k), which are obtained as described above. Equation 6 can be reexpressed as shown in Equation 7:

$$R(\theta) = \sum_{k=\theta}^{\theta+T_P+1} r(k)r^*(k + T_P + T_C + T) \quad \text{Equation 7}$$

Equation 7 represents cross-correlation during one pilot guard interval $T_P$ between the received signal r(k) and another signal $r(k+T_P+T_C+T)$ delayed one pilot guard interval from the signal r(k). That is, $R(\theta)$ denotes the cross-correlation value. The angle or argument $\theta$ of $R(\theta)$ is a phase element of Equation 6 and enables estimation of the frequency offset. Therefore, the frequency offset can be expressed as shown in Equation 8:

$$\tilde{\varepsilon} = -\frac{1}{2\pi} \frac{T}{T + T_C + T_P} \angle R(\theta) \quad \text{Equation 8}$$

Figure 10:
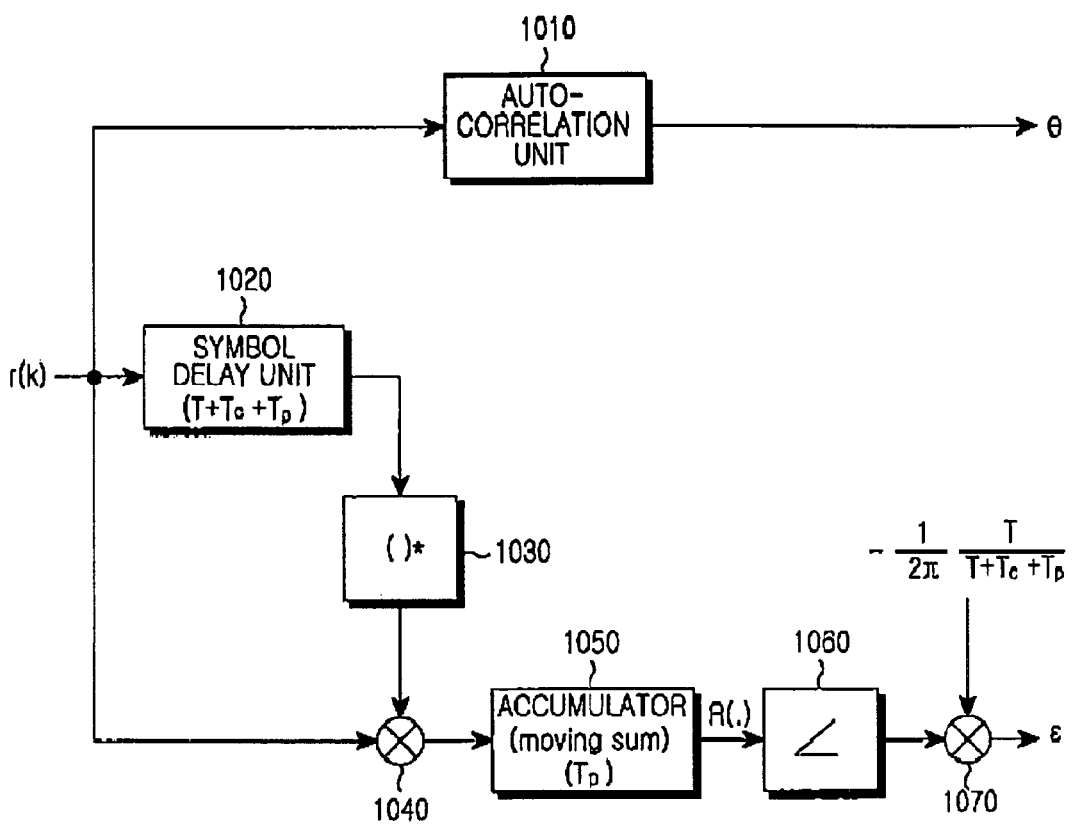
FIG. 10 illustrates a synchronization acquisition unit for frequency offset estimation and synchronization using a pilot guard interval according to an embodiment of the present invention.

FIG. 10 illustrates a synchronization acquisition unit for frequency offset estimation and synchronization using a pilot guard interval according to an embodiment of the present invention, which is an internal construction of the synchronization and channel estimation device 850 shown in FIG. 8.

Referring to FIG. 10, a received baseband signal is inputted to and is auto-correlated in an auto-correlation unit 1010, which then sets the k having the maximum value as the time offset θ. Meanwhile, r(k) is delayed for a period of one symbol by a delay unit 1020, is subjected to conjugation by an operator 1030, and is then multiplied by itself by a multiplier 1030. The multiplied value is accumulated during $T_P$ at the estimated time offset θ by an accumulator 1050. An argument 1060 of the accumulated value is multiplied by $$-\frac{1}{2\pi} \frac{T}{T + T_C + T_P}$$

by the multiplier 1070, so that it can be used in estimation of the frequency offset ε.

Figure 11:
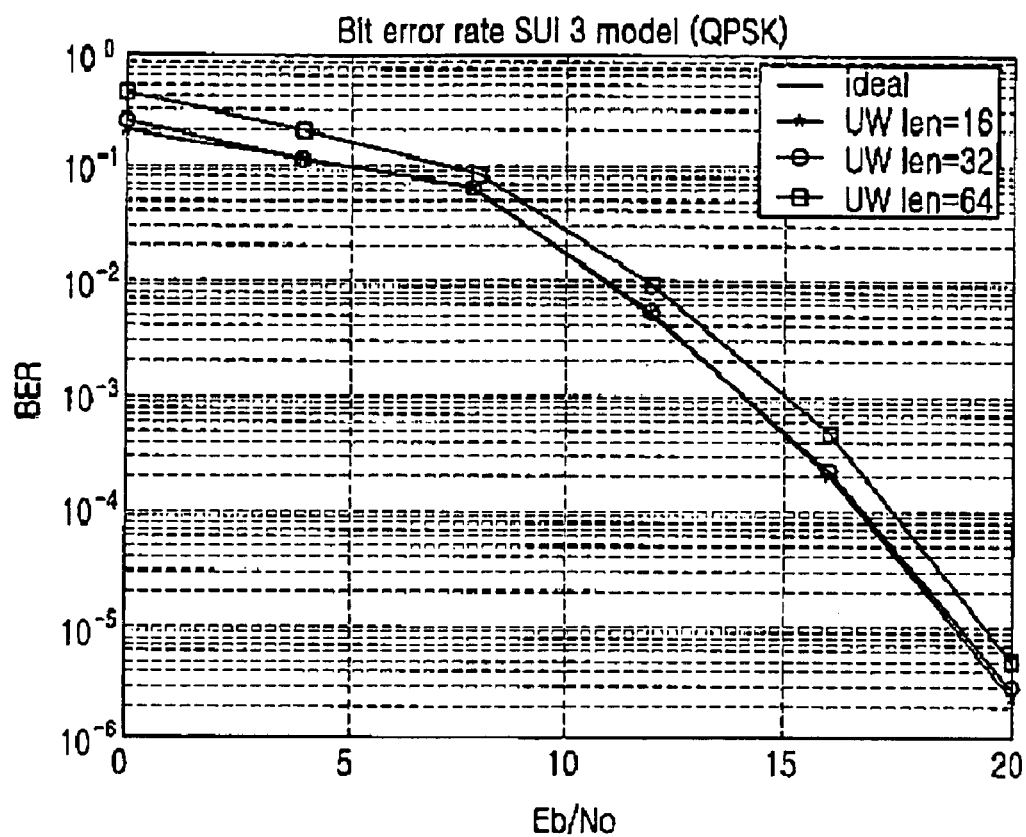
FIGS. 11 to 13 are graphs showing simulation results according to embodiments of the present invention.
Figure 12:
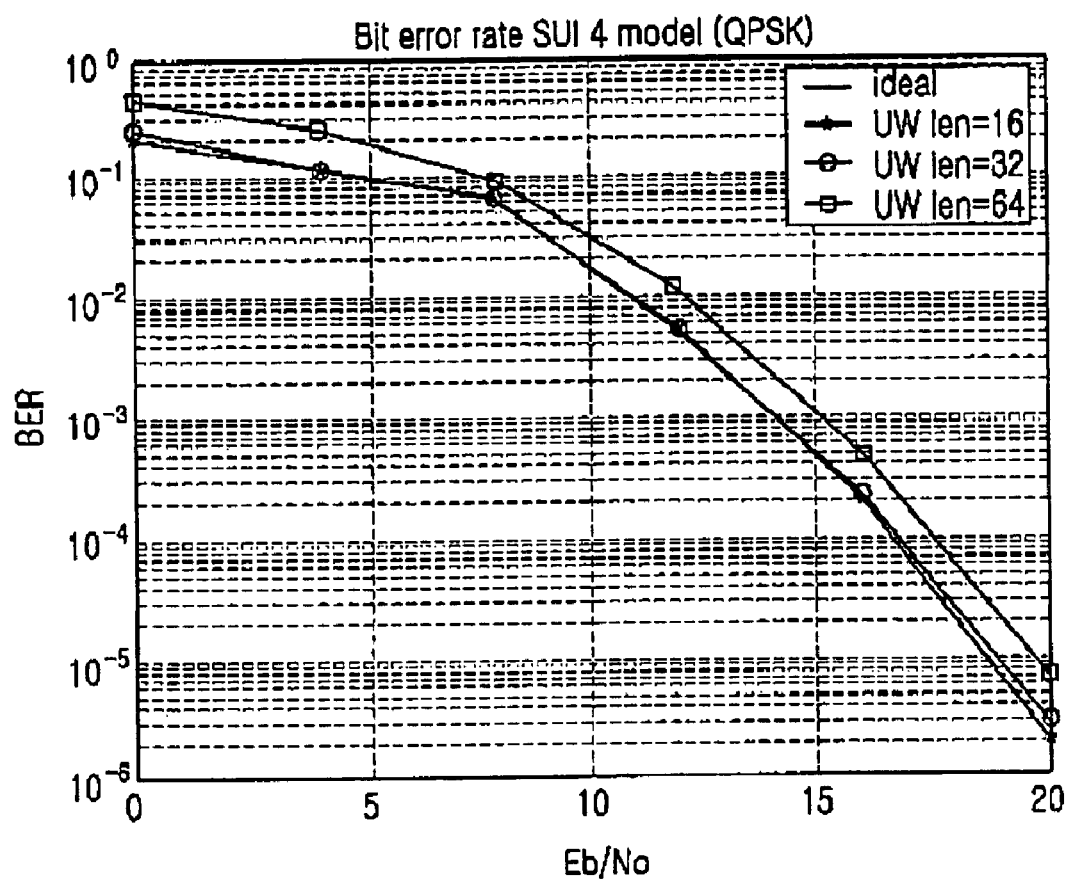
Figure 13:
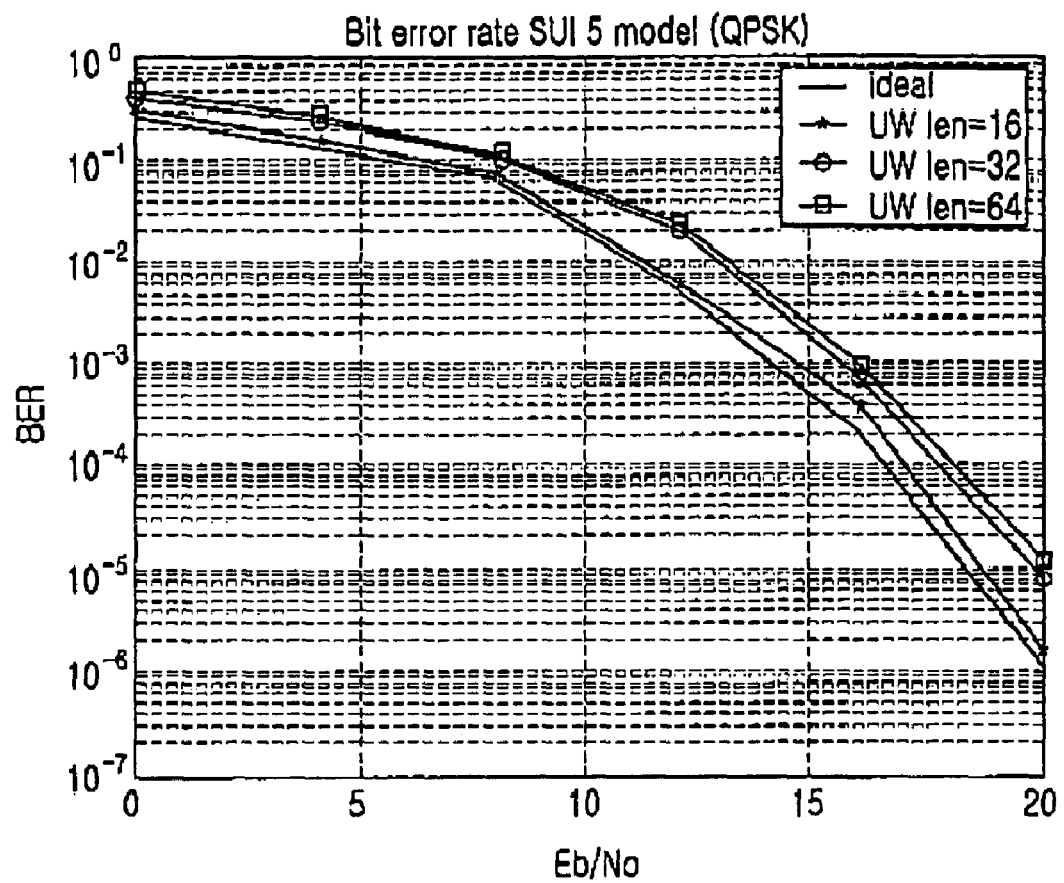

FIGS. 11 to 13 are graphs showing simulation results according to embodiments of the present invention. FIGS. 11 to 13 show simulation results when the multipath channel employs a SUI (Stanford University Interim) 3 model, a SUI 4 model, and a SUI 5 model, respectively.

The simulation results have been obtained through simulation on the following conditions shown in Table 2.

TABLE 2

* FFT size : 256
* Guard interval size : 64
* Bandwidth : 5MHz
* Multipath channel : SUI 3, SUI 4, SUI 5
* Modulation : QPSK
* Coding : CC with bit interleaver
* Perfect synchronization is assumed
* Perfect channel estimation is assumed
 * Inserted UW length (UW len) is : 16, 32, 64

The simulation results show that, when the UW length and the maximum channel impulse response delay normalized by sampling time are less than the guard interval size (for example, UW length is 16, 32 in SUI 3 and SUI 4 model), the inserted UW's interference can be easily removed after passing the pre-existing guard interval remover. Therefore, the Bit Error Rate (BER) performance under different Eb/N0 is the same as the associated ideal case (without inserted UW and with only the guard interval).

In contrast, when the UW length and the maximum channel impulse response delay normalized by sampling time are larger than the guard interval size and only the pre-existing guard interval is employed, the inserted UW will be an interference on the data field, so that the interference cannot be completely removed. However, because the reception terminal can understand the UW, such interference can be easily removed if exact channel information is obtained. For example, when the length of the UW is 64 in the SUI 3, SUI 4, and SUI 5 models (see FIGS. 11 to 13), or when the length of the UW is 16, 32, or 64 in the SUI 5 model (see FIG. 13), although the UW has been inserted in the guard interval, there has been 1-3 dB $E_b/N_0$ performance reduction in comparison with the associated ideal case. However, the inserted Unique Words can be used for channel, timing and carrier offset estimation for OFDM system.

As described above, the pilot data row inserted in an OFDM communication system according to the present invention can improve synchronization acquisition. Further, improvement in the synchronization acquisition enables exact detection of a beginning point of an FFT window, thereby reducing interference between adjacent symbols and interference between channels. Further, insertion of a pilot data row in a time domain of an OFDM symbol enables change of channels to be traced in a time varying channel, and prolongs a packet or frame comprised of a preamble and data, thereby maximizing the ratio of preamble to data and enabling transmission of information without loss of performance, which results in improvement in transmission efficiency of the system.

Also, the pilot data row according to the present invention may be used to replace pilot carriers in the frequency domain, so that the pilot carrier can be used as a data carrier to further improve the transmission efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting an Orthogonal Frequency Division Multiplexing (OFDM) symbol in an OFDM communication system, the OFDM symbol including a guard interval and a data interval, the method comprising the steps of:

copying data at a predetermined interval in a data row inputted to be transmitted;

filling the copied data and unique words in the guard interval and filling the data row in the data interval, the unique words having a constant amplitude and a non-periodic auto-correlation characteristic; and transmitting the OFDM symbol comprised of the guard interval and the data interval filled with the unique words and the data row;

wherein the guard interval includes a first interval, a second interval, and a third interval, which are continuing in sequence, a portion of the copied data being filled in the first interval, the uniqiue words being filled in the second interval, a other portion of the copied data being filled in the third interval.

2. The method as claimed in claim 1, wherein the guard interval is located before the data interval.

3. The method as claimed in claim 1, wherein the unique words are a pilot data row.

4. A method for generating an OFDM symbol for transmission in an OFDM communication system, the method comprising the steps of:
- copying first data at a first interval and second data at a second interval in a data row inputted to be transmitted;
- generating a first guard interval symbol in which unique words are filled, the unique words having a constant amplitude and a non-periodic auto-correlation characteristic;
- generating a second guard interval symbol in which the copied first data are filled;
- generating a data interval symbol in which the inputted data row is filled; and
- generating a third guard interval symbol in which the copied second data are filled;
- generating the OFDM symbol, which is comprised of the first guard interval symbol, the second guard interval symbol, the data interval symbol, and the third guard interval symbol;
- wherein the inputted data row is divided into a first data row and a second data row continuing in sequence, and one of the first interval and the second interval at which the first data are copied is located at a rearmost portion of the first data row.

5. The method as claimed in claim 4, wherein the unique words are a pilot data row.

6. An apparatus for transmitting an OFDM symbol in an OFDM communication system, the OFDM symbol including a guard interval and a data interval, the apparatus comprising:
- a guard interval filling means for copying data at a predetermined interval in a data row inputted to be transmitted, and filling the copied data in the guard interval set in advance in the input data row; and
- a selection means for selectively receiving an output data row outputted from the guard interval filling means and unique words having a constant amplitude and a non-periodic auto-correlation characteristic, and outputting the OFDM symbol in which the unique words are inserted in the output data row;
- wherein the guard interval is located before the input data row, and the unique words are located in the middle of the guard interval.

7. The apparatus as claimed in claim 6, further comprising:
- a buffer for storing the unique words; and
- a control unit for controlling selective input operation of the selection means.

8. The apparatus as claimed in claim 6, wherein the guard interval has two portions, one portion located before the input data row and the other portion located after the input data row.

9. The apparatus as claimed in claim 8, wherein the unique words are located before the guard interval.

* * * * *